US010696268B2

(12) United States Patent
Tokuda et al.

(10) Patent No.: US 10,696,268 B2
(45) Date of Patent: Jun. 30, 2020

(54) CLOSING STRUCTURE FOR OPENING OF CYLINDRICAL HOUSING AND GAS GENERATOR

(71) Applicant: DAICEL CORPORATION, Osaka-shi, Osaka (JP)

(72) Inventors: Masakazu Tokuda, Tatsuno (JP); Masayuki Nakayasu, Tatsuno (JP); Naoki Nakatsuka, Tatsuno (JP)

(73) Assignee: DAICEL CORPORATION, Osaka-Shi, Osaka (JP)

( * ) Notice: Subject to any disclaimer, the term of this patent is extended or adjusted under 35 U.S.C. 154(b) by 169 days.

(21) Appl. No.: 15/744,343

(22) PCT Filed: Jun. 16, 2016

(86) PCT No.: PCT/JP2016/067953
§ 371 (c)(1),
(2) Date: Jan. 12, 2018

(87) PCT Pub. No.: WO2017/022340
PCT Pub. Date: Feb. 9, 2017

(65) Prior Publication Data
US 2018/0222437 A1      Aug. 9, 2018

(30) Foreign Application Priority Data

Aug. 5, 2015  (JP) ................................ 2015-154900

(51) Int. Cl.
*B60R 21/272*      (2006.01)
*B60R 21/264*      (2006.01)
(Continued)

(52) U.S. Cl.
CPC .......... *B60R 21/272* (2013.01); *B60R 21/263* (2013.01); *B60R 21/264* (2013.01);
(Continued)

(58) Field of Classification Search
CPC .. B60R 21/264; B60R 21/2644; B60R 21/272
See application file for complete search history.

(56) References Cited

U.S. PATENT DOCUMENTS 5,863,067 A * 1/1999 Blumenthal .......... B60R 21/015
                                                              280/736
6,053,531 A * 4/2000 Katsuda .............. B60R 21/2644
                                                              280/741
(Continued)

FOREIGN PATENT DOCUMENTS

DE       102017108176 A1 * 10/2018 ......... B60R 21/2338
EP            3415377 A1 * 12/2018 ........... B60R 21/264
(Continued)

*Primary Examiner* — Nicole T Verley
(74) *Attorney, Agent, or Firm* — Birch, Stewart, Kolasch & Birch, LLP

(57) ABSTRACT

The present invention provides a closing structure which closes, with an igniter, an opening of a cylindrical housing used in a gas generator, the cylindrical housing provided with a stepped surface formed on an inner side of a circumferential wall on the side of the opening, and a distal end circumferential wall extending from the stepped surface to the opening, the igniter having an igniter main body, and an igniter collar surrounding part of the igniter main body and having an annular plate portion with a maximum outer diameter and a circumferential wall excluding the annular plate portion, the annular plate portion including, a first annular surface facing the ignition portion of the igniter main body, a second annular surface facing the electroconductive pin of the igniter main body, and an annular circumferential surface between the first annular surface and the second annular surface, a first annular circumferential edge at the boundary between the first annular surface and the annular circumferential surface, and a second annular circumferential edge at the boundary between the second annular surface and the annular circumferential surface, and (Continued)

the second annular circumferential edge provided with an inclined surface in three or more locations, and the first annular surface of the igniter collar being abutted against the stepped surface of the cylindrical housing, and the annular circumferential surface and the second annular circumferential edge of the igniter collar being abutted against the distal end circumferential wall.

12 Claims, 5 Drawing Sheets

(51) Int. Cl.
  *B60R 21/263* (2011.01)
  *B60R 21/26* (2011.01)
  *B60R 21/268* (2011.01)
(52) U.S. Cl.
  CPC ........... *B60R 2021/26011* (2013.01); *B60R 2021/26029* (2013.01); *B60R 2021/26035* (2013.01); *B60R 2021/26076* (2013.01); *B60R 2021/2685* (2013.01)

(56) References Cited

U.S. PATENT DOCUMENTS

| | | | | |
|---|---|---|---|---|
| 6,068,292 | A * | 5/2000 | Renz | B60R 21/272 280/737 |
| 6,123,359 | A * | 9/2000 | Cabrera | B01D 39/10 149/36 |
| 6,412,816 | B1 * | 7/2002 | Gast | B01D 39/12 280/736 |
| 6,485,053 | B2 * | 11/2002 | Fujimoto | B60R 21/272 280/737 |
| 7,658,406 | B2 * | 2/2010 | Townsend | B60R 21/264 280/736 |
| 7,802,813 | B2 * | 9/2010 | Yamashita | B21D 39/06 280/741 |
| 7,823,918 | B2 * | 11/2010 | Finnigan | B23K 11/3081 280/736 |
| 8,167,334 | B2 * | 5/2012 | Kratz | B60R 21/2644 102/531 |
| 8,393,274 | B2 | 3/2013 | Luquet et al. | |
| 8,459,694 | B2 * | 6/2013 | Chen | B60R 21/272 102/202.14 |
| 8,573,130 | B2 * | 11/2013 | Chen | B60R 21/272 102/202.14 |
| 9,321,426 | B1 * | 4/2016 | Krupp | B60R 21/264 |
| 9,428,142 | B2 * | 8/2016 | Divo | B60R 21/264 |
| 2005/0062273 | A1 | 3/2005 | Matsuda et al. | |
| 2006/0255577 | A1 | 11/2006 | Nakayasu et al. | |
| 2007/0024038 | A1 | 2/2007 | Numoto et al. | |
| 2007/0063497 | A1 * | 3/2007 | Nakayasu | B60R 21/268 280/736 |
| 2007/0200326 | A1 | 8/2007 | Nakayasu et al. | |
| 2009/0051152 | A1 | 2/2009 | Yamashita et al. | |
| 2011/0148084 | A1 | 6/2011 | Kratz et al. | |
| 2011/0248486 | A1 | 10/2011 | Numoto | |
| 2011/0254254 | A1 | 10/2011 | Numoto | |
| 2012/0079959 | A1 | 4/2012 | Chen et al. | |
| 2014/0123868 | A1 | 5/2014 | Kobayashi | |
| 2014/0208975 | A1 | 7/2014 | Kobayashi et al. | |
| 2014/0230685 | A1 | 8/2014 | Hanano et al. | |

FOREIGN PATENT DOCUMENTS

| | | |
|---|---|---|
| JP | 5-92402 U | 12/1993 |
| JP | 2001-254749 A | 9/2001 |
| JP | 2005-53440 A | 3/2005 |
| JP | 2006-306218 A | 11/2006 |
| JP | 2007-30656 A | 2/2007 |
| JP | 2007-223485 A | 9/2007 |
| JP | 2008-241186 A | 10/2008 |
| JP | 2009-51236 A | 3/2009 |
| JP | 2011-189833 A | 9/2011 |
| JP | 2011-218942 A | 11/2011 |
| JP | 2011-225069 A | 11/2011 |
| JP | 2012-505102 A | 3/2012 |
| JP | 2012-76489 A | 4/2012 |
| JP | 2014-94614 A | 5/2014 |
| JP | 2014-144736 A | 8/2014 |
| JP | 2014-156207 A | 8/2014 |
| JP | 2015-9666 A | 1/2015 |
| JP | 2015-89760 A | 5/2015 |
| JP | 6250434 B2 * | 12/2017 |
| WO | WO 2005/014346 A1 | 2/2005 |
| WO | WO 2011/125567 A1 | 10/2011 |
| WO | WO 2011/132720 A1 | 10/2011 |
| WO | WO-2018186116 A1 * | 10/2018 ............... B01J 7/00 |
| WO | WO-2018212080 A1 * | 11/2018 ........... B60R 21/264 |

* cited by examiner

[Fig. 1]
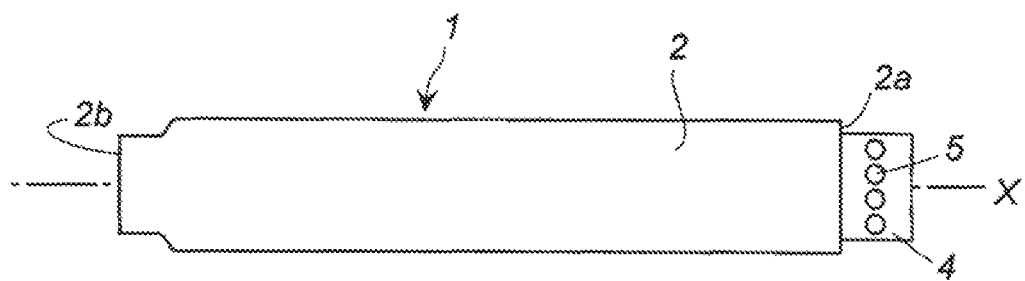
[Fig. 2]
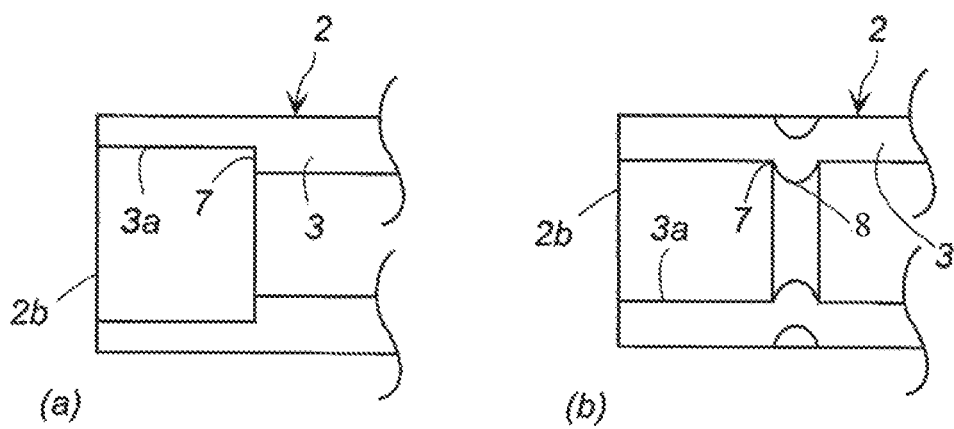
(a)　　　　　　　　　(b)

[Fig. 3]
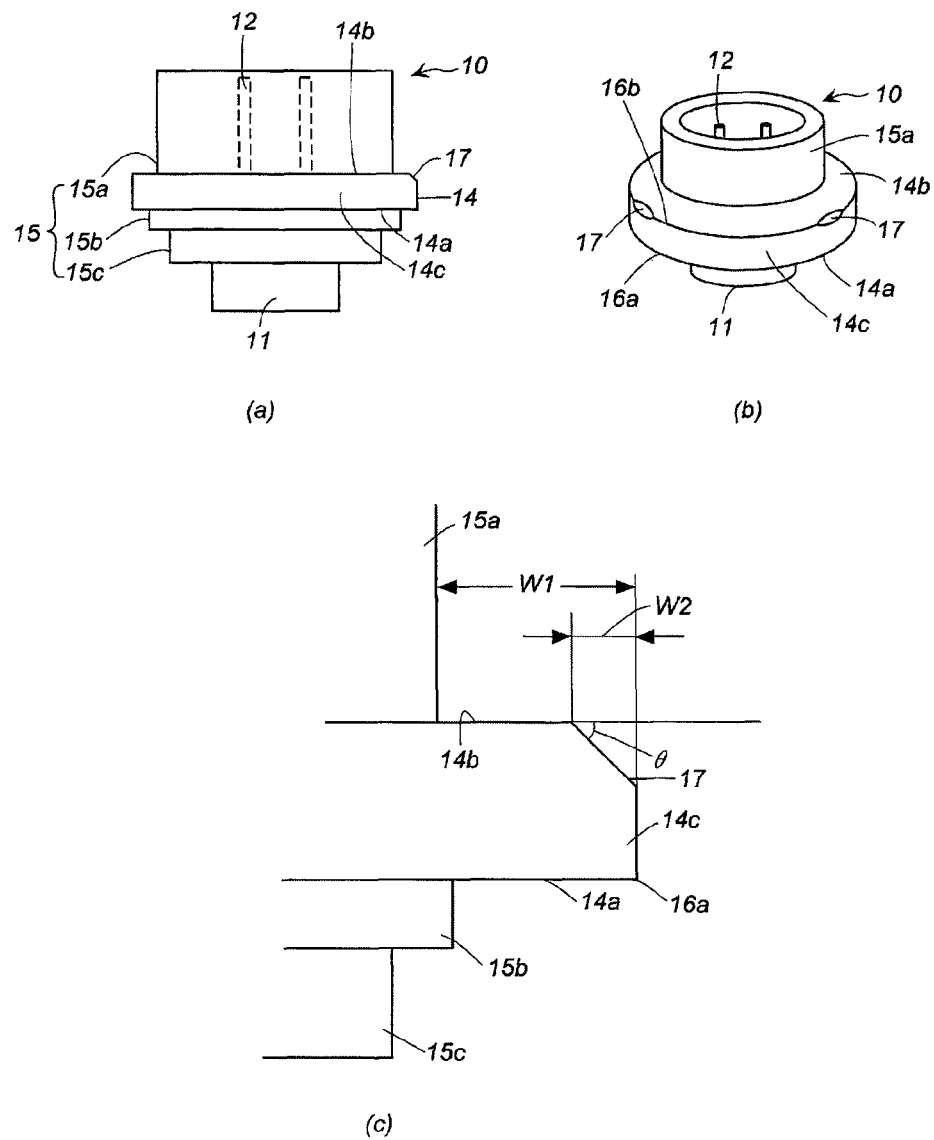

[Fig. 4]
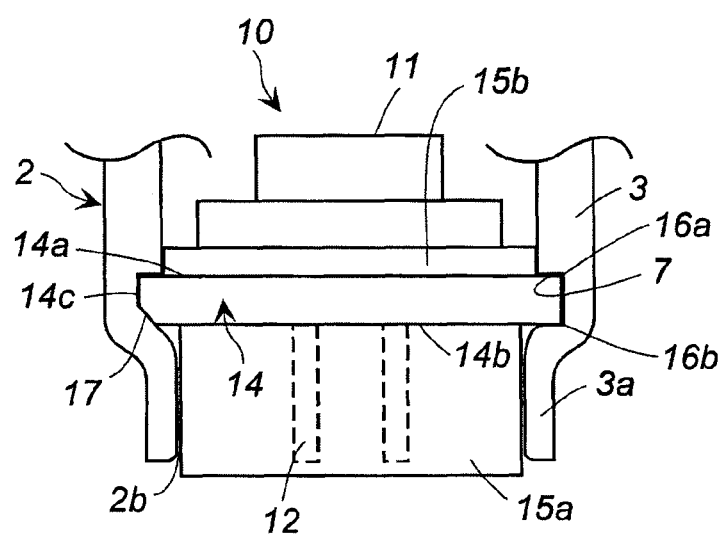

[Fig. 5]
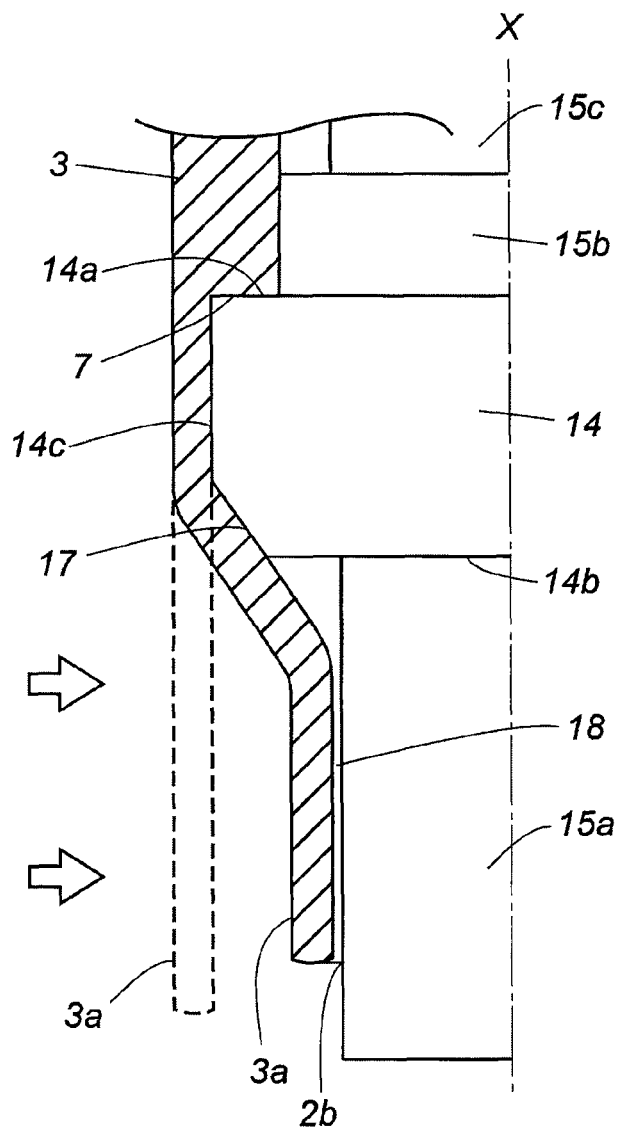

[Fig. 6]
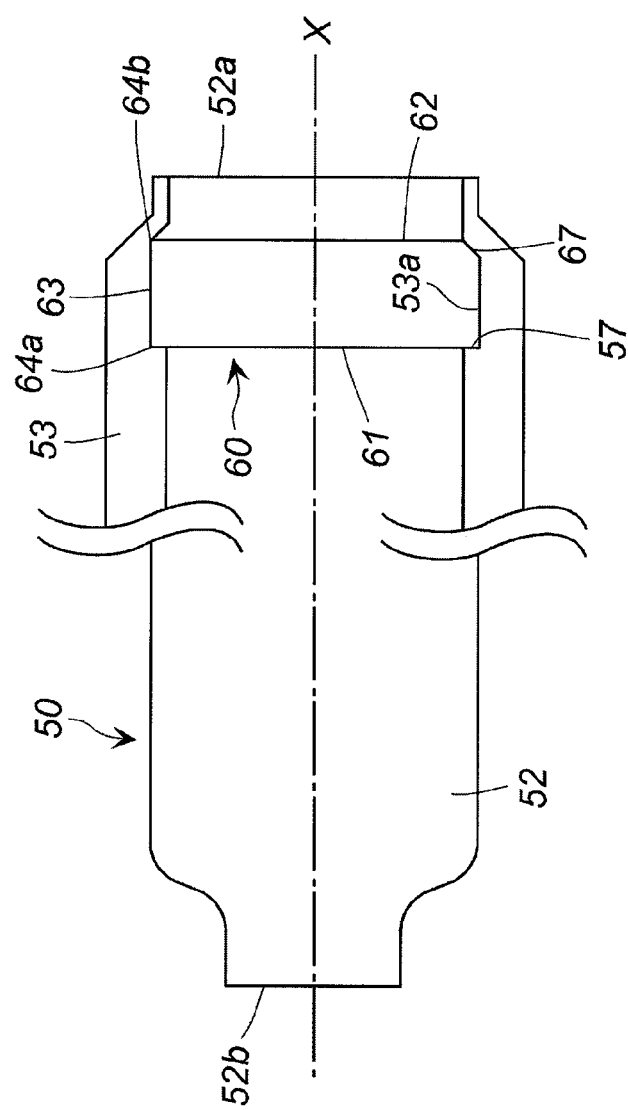

CLOSING STRUCTURE FOR OPENING OF CYLINDRICAL HOUSING AND GAS GENERATOR

FIELD OF INVENTION

The present invention relates to a closing structure for an opening of a cylindrical housing for use in a gas generator usable in an airbag apparatus installed on an automobile or the like, and also to a gas generator including the closing structure.

DESCRIPTION OF RELATED ART

Cylindrical or disk-shaped gas generators are used in accordance with a shape of a housing serving as a container.

In a gas generator using a cylindrical housing, openings at both ends of the cylindrical housing are closed. As a closing method, a deep-drawing process or the like is employed to produce a housing in which an opening at one end is closed in advance. Also, widely employed is a closing method in which a cylindrical housing is combined with a component arranged at both ends thereof.

In particular, when a cylindrical housing is used, an igniter is often disposed at one end opening, and the opening is often closed by combining the igniter with the cylindrical housing.

U.S. Pat. No. 8,393,274 discloses a gas generator in which an initiator 2 is attached to one open end of a casing 1.

In a collar portion, the initiator 2 is fixed to an adapter sleeve 3 made of a plastic through a gasket 31.

With the adapter sleeve 3 arranged at an end portion 1A of the casing 1, the casing 1 is crimped annularly from the outside to form a necking 12, thereby fixing the adapter sleeve 3.

SUMMARY OF INVENTION

The first aspect of the present invention (hereinafter referred to as the "first aspect") provides a closing structure with an igniter for an opening of a cylindrical housing, which closes, with the igniter, one of two openings at both ends of the cylindrical housing used in a gas generator, the cylindrical housing being provided with a stepped surface formed radially on an inner side of a circumferential wall on the side of one of the two openings, and a distal end circumferential wall extending from the stepped surface to the opening, the igniter having an igniter main body including an ignition portion and an electroconductive pin extending axially opposite to the ignition portion, and an igniter collar surrounding part of the igniter main body, the igniter collar having an annular plate portion protruding radially outward and having a maximum outer diameter, and a circumferential wall excluding the annular plate portion, the annular plate portion including,
a first annular surface facing the ignition portion, a second annular surface facing the electroconductive pin, and an annular circumferential surface between the first annular surface and the second annular surface,
a corner portion which is a first annular circumferential edge at the boundary between the first annular surface and the annular circumferential surface, and a corner portion which is a second annular circumferential edge at the boundary between the second annular surface and the annular circumferential surface, and the corner portion, which is the second annular circumferential edge, being provided with a portion in a form of an inclined surface, the inclined surface being formed in not less than three locations, and the first annular surface of the igniter collar being abutted against the stepped surface of the cylindrical housing, and the annular circumferential surface and the second annular circumferential edge which is provided with the inclined surface, of the igniter collar, being abutted against the distal end circumferential wall, in order to close the opening of the cylindrical housing which is provided with the stepped surface and the distal end circumferential wall.

Further, the present invention provides a gas generator which has the closing structure with an igniter according to the first aspect, the gas generator including, a diffuser portion being provided with a gas discharge port and arranged at a first end opening which is one of two openings of the cylindrical housing, the closing structure with the igniter being arranged at a second end opening which is the remaining opening of the cylindrical housing, and a space between the diffuser portion and the igniter being filled with at least a gas generating agent as the gas generating source.

Further, the present invention provides a gas generator which has the closing structure with an igniter according to the first aspect, the gas generator including, a first end opening, which is one of two openings of the cylindrical housing, being closed, the closing structure with an igniter being arranged at a second end opening which is the remaining opening of the cylindrical housing, a pressurized gas chamber, which is filled with a pressurized gas, being formed on the side of the first end opening, a gas generating chamber, which is filled with a gas generating agent, being formed on the side of the second end opening, and a plenum chamber, which is partitioned by a rupturable partition wall, being formed between the pressurized gas chamber and the gas generating chamber, and a gas discharge port being formed in a circumferential wall of the cylindrical housing facing the plenum chamber.

The second aspect of the present invention (hereinafter referred to as the "second aspect") provides a closing structure with a flat plate-shaped closing member for an opening of a cylindrical housing, which closes, with the flat plate-shaped closing member, one of two openings at both ends of the cylindrical housing used in a gas generator, the cylindrical housing being provided with a stepped surface or an annular stepped surface formed radially on an inner side of a circumferential wall on the side of one of the two openings, and a distal end circumferential wall extending from the stepped surface or the annular stepped surface to the opening, the flat plate-shaped closing member having
a first surface, a second surface on the opposite side in the thickness direction, and a circumferential surface between the first surface and the second surface,
a corner portion which is a first annular circumferential edge at the boundary between the first surface and the circumferential surface, and a corner portion which is a second annular circumferential edge at the boundary between the second surface and the circumferential surface, and the corner portion, which is the second annular circumferential edge, being provided with a portion in a form of an inclined surface, the inclined surface being formed in not less than three locations, and the first surface of the flat plate-shaped closing member being abutted against the stepped surface or the annular stepped surface of the cylindrical housing, and the circumferential surface and the second annular circumferential edge which is provided with the inclined surface, of the flat plate-shaped closing member, being abutted against the distal end circumferential wall, in order to close the opening of the cylindrical housing, which is provided with the stepped surface or the annular stepped surface and the distal end circumferential wall.

Further, the present invention provides a gas generator having the closing structure with a flat plate-shaped closing member according to the second aspect, the gas generator including, a cylindrical housing provided with a gas discharge port in a circumferential wall, the closing structure with a flat plate-shaped closing member being arranged at a first end opening of the cylindrical housing, an igniter being attached to a second end opening of the cylindrical housing, and a combustion chamber, which is filled with a gas generating agent, being formed inside the cylindrical housing.

BRIEF DESCRIPTION OF DRAWINGS

The present invention will become more fully understood from the detailed description given hereinbelow and the accompanying drawings which are given by way of illustration only, and thus are no limitative of the present invention and wherein:

FIG. 1 shows a front view of a gas generator of the present invention;

FIG. 2 shows, in (a), a cross-sectional view in the long axis direction on the side of the second opening of the cylindrical housing in the gas generator according to the present invention before attaching the igniter, and in (b), a cross-sectional view in the long axis direction on the side of the second opening of the cylindrical housing of an embodiment other than that shown in (a);

FIG. 3 shows, in (a), a front view of an igniter used in the gas generator of the present invention, in (b), a perspective view of the igniter shown in (a), and in (c), a partial enlarged view of the igniter shown in (a);

FIG. 4 shows a cross-sectional view in the long axis direction showing an attachment structure of an igniter in the gas generator of the present invention;

FIG. 5 shows a partially enlarged view of the attachment structure shown in FIG. 4; and FIG. 6 shows a front view of a gas generator according to another embodiment, part thereof (on the side of the first end opening) being shown in an enlarged sectional view.

DETAILED DESCRIPTION OF INVENTION

In the gas generator of U.S. Pat. No. 8,393,274, the adapter sleeve 3 and the gasket 31 are required to fix the collar portion of the igniter 2 to the casing 1, which increases the number of parts. In addition, a step of arranging the adapter sleeve 3 and the gasket 31 and a step of annularly crimping the casing 1 from the outside are needed, which also increases the number of manufacturing steps.

Further, since the adapter sleeve 3 is made of plastic, a transfer charge or a gas generating agent cannot be arranged at a position close to the igniter 2, and as shown in FIG. 1, it is necessary to arrange a washer 4 having a spring 5 to form a gap between the igniter 2 and a pyrotechnic charge 6.

Furthermore, because of a strength of plastics, it is difficult to perform strong crimping with respect to the adapter sleeve 3, and it is conceivable that fixing of the adapter sleeve 3 is likely to be insufficient.

The present invention provides a closing structure with an igniter or a closing member to close an opening of a cylindrical housing, the closing structure making it possible to fix the igniter to the end opening of the housing with high sealing property and fixing property without increasing the number of parts and manufacturing steps. The present invention also provides a gas generator including the above closing structure.

The present invention provides a closing structure with an igniter to close an opening of a cylindrical housing (hereinafter sometimes referred to as "closing structure with an igniter"), which closes one of two openings at both ends of the cylindrical housing with an igniter.

As described above, when such a cylindrical housing is used that an opening at one end is closed in advance by employing a deep-drawing process or the like, the closing structure with an igniter is arranged to close the remaining opening.

The closing structure with an igniter according to the present invention can be applied in a gas generator in which only a gas generating agent is used as a gas generation source, and a gas generator in which both the gas generating agent and a pressurized gas are used.

The cylindrical housing has two openings, that is a first end opening and a second end opening, and one of these openings is closed by the igniter.

When the second end opening is closed by the igniter, the first end opening is closed.

When the second opening is closed by the igniter, the first end opening can be closed in accordance with one of the followings:

(I) For example, as shown in FIG. 1 of JP-A No. 2015-89760 and FIG. 1 of JP-A No. 2014-156207, a gas generating agent is used as a gas generation source and an opening is closed by a diffuser portion provided with a gas discharge port (closed with a seal tape);

(II) For example, as shown in FIG. 1 of JP-A No. 2006-306218, both a gas generating agent and a pressurized gas are used as a gas generating source and an opening is closed by fixing a rupturable plate and a diffuser portion provided with a gas discharge port (closed with a seal tape);

(III) For example, as shown in FIG. 1 of JP-A No. 2015-9666, FIG. 1 of JP-A No. 2014-144736 and FIG. 1 of JP-A No. 2014-94614, the first end opening is closed, both a gas generating agent and a pressurized gas are used as a gas generating source and a gas discharge port is provided in a housing circumferential wall; and (IV) For example, as shown in FIGS. 1 and 2 of JP-A No. 2015-9666 and FIGS. 1 and 2 of JP-A No. 2011-189833, one opening of a cylindrical housing is closed in advance.

In addition, the present invention can be also applied to (V) a gas generator in which two cylindrical housings are connected in an axial direction and an igniter is fitted in a connection portion as shown in FIGS. 1 and 2 of JP-A No. 2005-53440.

When the second end opening of the cylindrical housing is closed by the igniter, the circumferential wall on the side of the second end opening has a stepped surface formed radially on the inner side, and a distal end circumferential wall extending from the stepped surface to the second end opening.

The stepped surface may be an annular stepped surface formed by a difference in thickness of the housing circumferential wall, or may be an annular convex portion formed on the inner circumferential surface of the housing circumferential wall, or a plurality of convex portions discontinuously formed thereon.

When the stepped surface is obtained by a difference in thickness of the housing circumferential wall, the stepped surface is obtained by making a wall thickness of the distal end circumferential wall smaller than a wall thickness of the housing circumferential wall.

When the stepped surface is obtained by the annular convex portion formed on the inner circumferential surface of the housing circumferential wall, or by the plurality of the convex portions discontinuously formed thereon, an annular concave portion formed on the outer circumferential surface of the housing circumferential wall, or a plurality of concave portions discontinuously formed thereon, that is, an annular convex portion formed on the inner circumferential surface of the housing circumferential wall, or a plurality of convex portions discontinuously formed thereon are used. At this time, a wall thickness of the distal end circumferential wall is the same as a thickness of the remaining housing circumferential wall.

The igniter used in the closing structure with the igniter according to the present invention includes an igniter main body and an igniter collar.

The igniter collar has an annular plate portion protruding radially outward and having a maximum outer diameter, and a circumferential wall excluding the annular plate portion.

It is preferable that, in the igniter collar, the annular plate portion with the maximum outer diameter is made of a metal, and the circumferential wall is made of a resin.

Alternatively, the annular plate portion is preferably made of a metal, and the circumferential wall is preferably made of a resin or a metal.

The circumferential wall may have a uniform outer diameter or may have a portion with a different outer diameter.

In the annular plate portion of the igniter collar, a corner portion, which is the second annular circumferential edge, has a portion (an inclined surface) in the form of an inclined surface, and the inclined surface is formed in three or more locations.

The inclined surface which is abutted against the inner circumferential wall surface of the housing is an important part in order to enhance the sealing function and to enhance the rotation preventing function for the igniter.

The number of the inclined surfaces is preferably 3 to 6, more preferably 3 or 4, and it is preferable that the inclined surfaces are formed at equal intervals in the circumferential direction.

When the second end opening of the cylindrical housing is closed by the igniter, the first annular surface of the igniter collar is abutted against the stepped surface of the cylindrical housing, the annular circumferential wall and the second annular circumferential edge which is provided with the inclined surfaces, of the igniter collar, are abutted against the distal end circumferential wall, and thereby, the second end opening is closed.

When the second end opening of the cylindrical housing is closed in such a state, the closing is performed by swaging (reducing the diameter by applying a load from the outside) the distal end circumferential wall of the cylindrical housing. The swaging method is known, and a rolling-swaging method (for example, described in paragraphs 0037 and 0038 in JP-A No. 2007-223485, and paragraph 0035 in JP-A No. 2008-241186) is particularly preferable.

At this time, the inclined surface and the inner circumferential surface of the distal end circumferential wall are strongly abutted against each other, the corner portion of the second annular circumferential edge where the inclined surface is not formed and the inner circumferential surface of the distal end circumferential wall are strongly abutted against each other, and the distal end circumferential wall acts to push the second annular circumferential edge having the inclined surface in the long axis direction (in a direction toward the first end opening). Therefore, the annular plate portion of the igniter collar is pushed from both sides in the long axis direction between the stepped surface and the second annular circumferential edge having the inclined surface.

As a result, the sealing property between the cylindrical housing and the igniter (the igniter collar) is also good, and the igniter is unlikely to rotate.

It is preferable in the closing structure with an igniter according to the present invention that the first annular surface of the igniter collar is abutted against the stepped surface or an annular stepped surface of the cylindrical housing, the annular circumferential surface and the second annular circumferential edge which is provided with the inclined surface, of the igniter collar, are abutted against part of the distal end circumferential wall, so that an opening of the cylindrical housing, which is provided with the stepped surface or the annular stepped surface and the distal end circumferential wall, is closed, the remaining portion of the distal end circumferential wall is extended in a direction along the circumferential wall of the igniter collar, and a gap is formed between an inner circumferential surface of the remaining portion of the distal end circumferential wall and an outer circumferential surface of the circumferential wall of the igniter collar.

The distal end circumferential wall of the cylindrical housing is abutted against the annular circumferential surface and the second annular circumferential edge which is nor provided with the inclined surface, of the igniter collar, but the remaining portion which is not abutted thereagainst is extended in the direction along the circumferential wall of the igniter collar.

Here, the direction along the circumferential wall of the igniter collar substantially coincides with the long axis direction of the cylindrical housing.

Where the remaining portion of the distal end circumferential wall thus is extended in the direction along the circumferential wall of the igniter collar, when a pressure inside the gas generator rises at the time of actuation and a pressure toward the second end opening is applied to the igniter, a force which acts against the pressure increases. As a result, the igniter does not fall off from the second end opening of the cylindrical housing. Also, a swaging operation is facilitated as compared with a crimping performed to bend the distal end circumferential wall in a direction orthogonal to the long axis direction of the cylindrical housing.

Further, as described above, a gap is formed between the inner circumferential surface of the remaining portion of the distal end circumferential wall and the outer circumferential surface of the circumferential wall of the igniter collar.

In the absence of the gap, that is, in the case where part of the remaining portion of the distal end circumferential wall is abutted against the igniter collar, an axis of the igniter may be displaced, or the distal end circumferential wall and the igniter collar may be deformed by contact with each other at the time of swaging the distal end circumferential wall, which can cause a failure in inserting the electroconductive pin of the igniter into a connector connected with a lead wire.

In the closing structure with a igniter according to the present invention, it is possible that the annular plate portion with the maximum outer diameter of the igniter collar is made of a metal, and the circumferential wall is made of a resin.

With such a combination, the above-described sealing performance and rotation preventing performance are enhanced.

Further, it is preferable in the closing structure with an igniter according to the present invention that the inclined surface of the second annular circumferential edge is inclined such that an angle between the inclined surface and a surface extending along the second annular surface is 30° to 60°.

With the inclined surface inclined in the predetermined angle range, the above-described sealing performance and rotation preventing performance are enhanced.

The gas generator according to the present invention may be a gas generator including any of above described (I) to (V) in which the closing structure with an igniter according to the present invention is employed in order to close an opening of the cylindrical housing with an igniter.

In the closing structure with a flat plate-shaped closing member according to the second aspect, the first end opening of the cylindrical housing is closed by a flat plate-shaped closing member.

The flat plate-shaped closing member is made of a metal and is preferably made of the same material as the cylindrical housing, such as iron, stainless steel or the like.

In the closing structure with a flat plate-shaped closing member according to the second aspect, the flat plate-shaped closing member corresponds to the annular plate portion with the maximum outer diameter of the igniter collar of the above-described first aspect.

The flat plate-shaped closing member is formed of a plate having a shape conforming with the sectional shape of the cylindrical housing in the width direction.

When the sectional shape of the cylindrical housing in the width direction is circular, the closing member is made of a disk.

It is preferable in the closing structure with a flat plate-shaped closing member according to the second aspect that the inclined surface of the second annular circumferential edge of the closing member is inclined such that an angle between the inclined surface and the surface extending along the second surface is 30° to 60°.

With the inclined surface inclined in the predetermined angle range, the above-described sealing performance is enhanced.

The closing structure with a flat plate-shaped closing member according to the present invention can be employed, for example, as the second closing member 14 of the gas generator shown in FIGS. 1 and 2 of JP-A No. 2011-225069, the first closing member 14 of the gas generator shown in FIG. 1 of JP-A No. 2011-218942, and the closing structure with the second closure 16 in the gas generator 10 shown in FIG. 1, the gas generator 10a shown in FIG. 2 and the gas generator 10b shown in FIG. 3 of JP-A No. 2007-30656.

When the first end opening of the cylindrical housing is closed by the closing structure with a flat plate-shaped closing member according to the present invention, the second end opening can be closed by the igniter.

At this time, the second end opening can be closed in the same manner as in the above-described first aspect, or it can be closed in the same manner as in a known gas generator.

According to the present invention, an opening of a cylindrical housing is closed in a simple manner and with high sealing property by a combination of a single part and the cylindrical housing.

The gas generator of the present invention is usable as a gas generator for an air bag apparatus installed on a vehicle.

EMBODIMENTS OF THE INVENTION

Embodiments shown in FIGS. 1 to 5

In a gas generator 1 shown in FIG. 1, a second end opening 2b of a cylindrical housing 2 is closed by a closing structure with an igniter according to the present invention.

In the gas generator 1 shown in FIG. 1, a diffuser portion 8 is attached to a first end opening 2a of the cylindrical housing 2 in the same manner as in the above-described gas generators in (I) and (II).

The diffuser portion 8 is provided with a plurality of gas discharge ports 5 closed by a seal tape from the inside.

A known gas generating agent or a combination of a gas generating agent and a pressurized gas can be used as a gas generating source.

As shown in (a) in FIG. 2, a circumferential wall 3 of the cylindrical housing 2 is formed with a portion reduced in thickness (a distal end circumferential wall 3a) at the second end opening 2b, and an annular stepped surface 7 is obtained on the inner circumferential surface of the circumferential wall 3 by the difference in thickness between the circumferential wall 3 and the distal end circumferential wall 3a.

Since the distal end circumferential wall 3a is thinner than the circumferential wall 3 where the distal end circumferential wall 3a is not formed, the swaging operation is facilitated.

Further, the annular stepped surface 7 is not limited to the embodiment shown in (a) in FIG. 2, and may be embodied as shown in (b) in FIG. 2.

As shown in (b) in FIG. 2, the circumferential wall 3 of the cylindrical housing 2 is formed with an annular convex portion 8 on the side of the second end opening 2b, and the distal end circumferential wall 3a extends from the annular convex portion 8 to the second end opening 2b. A plurality of independent convex portions can be formed instead of the annular convex portion 8.

The distal end circumferential wall 3a has the same thickness as the circumferential wall 3 where the distal end circumferential wall 3a is not formed.

As shown in (a) and (b) in FIG. 3, an igniter 10 includes an igniter main body including an ignition portion 11 and an electroconductive pin 12 extending axially opposite to the ignition portion 11, and an igniter collar surrounding part of the igniter main body. The axis of the igniter 10 and the long axis X in FIG. 1 coincide.

The igniter collar has an annular plate portion 14 protruding radially outward and having a maximum outer diameter, and a circumferential wall 15 excluding the annular plate portion 14.

In (a) in FIG. 3, the circumferential wall 15 has, with the annular plate portion 14 in-between, a first circumferential wall 15a on the side of the electroconductive pin 12, and a second circumferential wall 15b and a third circumferential wall 15c on the side of the ignition portion 11. The first circumferential wall 15a, the second circumferential wall 15b and the third circumferential wall 15c have different outer diameters, but they may have the same outer diameter.

A space (a connector insertion space) to enclose the electroconductive pin 12 is formed inside the first circumferential wall 15a, and a concave portion matched to fit a hook portion of the connector is formed on the inner wall surface forming the connector insertion space.

The annular plate portion 14 is made of a metal (such as iron or stainless steel), and the circumferential wall 15 is made of a synthetic resin.

The annular plate portion 14 has a first annular surface 14a facing the ignition portion 11, a second annular surface 14b facing the electroconductive pin 12, and an annular circumferential surface 14c between the first annular surface 14a and the second annular surface 14b.

Further, the annular plate portion 14 has a corner portion which is a first annular circumferential edge 16a at the boundary between the first annular surface 14a and the annular circumferential surface 14c and a corner portion which is a second annular circumferential edge 16b at the boundary between the second annular surface 14b and the annular circumferential surface 14c.

The corner portion which is the second annular circumferential edge 16b has an inclined surface 17 in three or more locations. The inclined surface 17 is obtained by cutting part of the corner portion across the second annular surface 14b and the annular circumferential surface 14c, and it is preferable that the inclined surface is formed in three or four locations at equal intervals in the circumferential direction.

As shown in (c) in FIG. 3, the inclined surface 17 is inclined such that an angle (θ) between the inclined surface 17 and a surface extending along the second annular surface is 30° to 60°.

A length (a dimension in the circumferential direction) of the inclined surface 17 is preferably 4 mm to 8 mm.

A width (W1) of the second annular surface 14b (a length from the circumferential surface of the first circumferential wall 15a to the annular circumferential surface 14c) and a length (W2) of the portion corresponding to the inclined surface 17 on the extension line of the second annular surface 14b are preferably such that (W2/W1)×100 is in a range of 18% to 60%, and more preferably in a range of 20% to 50%.

W2 is preferably 0.3 mm to 1 mm.

As shown in FIGS. 4 and 5, the second end opening 2b of the cylindrical housing 2 is closed by the igniter 10 attached thereto.

The circumferential edge of the first annular surface 14a of the annular plate portion 14 is abutted against the annular stepped surface 7, and the annular circumferential surface 14c and the second annular circumferential edge 16b, which has the inclined surface 17 (in three or four locations), are abutted against the distal end circumferential wall 3a.

The remaining portion of the distal end circumferential wall 3a (a portion which is not abutted against the first circumferential wall 15a of the igniter collar) extends in a direction along the first circumferential wall 15a of the igniter collar (in the same direction as the long axis X of the cylindrical housing 2).

A gap 18 is formed between an inner circumferential surface of the remaining portion of the distal end circumferential wall 3a and the outer circumferential surface of the first circumferential wall 15a of the igniter collar.

Next, an embodiment of a method for attaching the igniter 10 to the second end opening 2b of the cylindrical housing 2 will be explained with reference to FIGS. 4 and 5.

A housing having the second end opening 2b formed as shown in (a) in FIG. 2 is used as the cylindrical housing 2.

The igniter 10 shown in (a) and (b) in FIG. 3 is fitted into the second end opening 2b of the housing 2 shown in (a) in FIG. 2 from the ignition portion 11. At this time, the igniter 10 is inserted until the circumferential edge of the first annular surface 14a of the annular plate portion 14 of the igniter collar abuts against the annular stepped surface 7.

Next, a known rolling-swaging method is applied to deform the distal end circumferential wall 3a shown by a dotted line in FIG. 5 so as to reduce the inner diameter inwardly in the radial direction (in the direction orthogonal to the long axis X), thereby obtaining the state of the distal end circumferential wall 3a shown by the solid line in FIG. 5.

At this time, the distal end circumferential wall 3a is abutted against the second annular circumferential edge 16b and the inclined surface 17, extends in the direction along the first circumferential wall 15a and forms the gap 18.

In the attachment state shown in FIG. 5, the distal end circumferential wall 3a acts to push the second annular circumferential edge 16b of the annular plate portion 14 and the inclined surface 17 in the direction of the long axis X, and further, the annular plate portion 14 is abutted against the annular stepped surface 7. In particular, the presence of the inclined surface 17 increases the pressing force in the direction of the long axis X as compared with the case where only the second annular circumferential edge 16b is present.

Thus, since the igniter collar is fixed in close contact with the cylindrical housing 2 at the annular plate portion 14, a sealing property is good, and penetration of moisture from the second end opening 2b is prevented. The rotation of the igniter 10 is also prevented.

Further, since the distal end circumferential wall 3a extends in the direction along the first circumferential wall 15a and hardly spreads outward in the radial direction, the igniter 10 is less likely to fall off even when the internal pressure rises at the time of actuation of the gas generator 1 and a pressure is applied toward the second end opening 2b.

Further, since the gap 18 is formed and the distal end circumferential wall 3a does not push the first circumferential wall 15a inward in the radial direction, the first circumferential wall 15a is not deformed and the connector is inserted without difficulty.

The closing structure with an igniter at the opening of the cylindrical housing shown in FIGS. 1 to 5 is applicable in a method for attaching an igniter in a gas generator including any of the above-mentioned (I) to (V) (a closing structure with an igniter).

Embodiment Shown in FIG. 6

In the embodiment shown in FIG. 6, a first end opening 52a of a cylindrical housing 52 is closed with a flat plate-shaped closing member 60, and an igniter is attached to a second end opening 52b, in a gas generator 50.

The cylindrical housing 52 has an annular stepped surface 57 formed radially on an inner side of a circumferential wall on the side of the first end opening 52a, and a distal end circumferential wall 53a extending from the annular stepped surface 57 to the first end opening 52a. The reference numeral 53 denotes a housing circumferential wall.

The distal end circumferential wall 53a and the annular stepped surface 57 can be the same as those in (a) or (b) in FIG. 2.

The flat plate-shaped closing member 60 is of a disk shape and has a first surface 61, a second surface 62 on the opposite side of the first surface 61 in the thickness direction and a circumferential surface 63 between the first surface 61 and the second surface 62.

The closing member 60 has a corner portion which is a first annular circumferential edge 64a at the boundary between the first surface 61 and the circumferential surface 63, and a corner portion which is a second annular circumferential edge 64b at the boundary between the second surface 62 and the circumferential surface 63.

The corner portion which is the second annular circumferential edge 64b has an inclined surface 67 in three or more locations. The inclined surface 67 is obtained by cutting part of the corner portion across the second surface 62 and the circumferential surface 63, and it is preferable that the inclined surface is formed in three or four locations at equal intervals in the circumferential direction.

Similarly to the embodiment shown in (c) in FIG. 3, the inclined surface 67 is inclined such that an angle (θ) between the inclined surface 67 and a surface extending along the second surface 62 is 30° to 60°.

A length (a dimension in the circumferential direction) of the inclined surface 67 is preferably 4 mm to 8 mm.

In the inclined surface 67, a length from the center of the disk-shaped closing member 60 to the circumferential surface (that is, radius r1) and a length (r2) from the center to the inclined surface 67 are preferably such that ((r1−r2)/r1)×100 is in a range of 18% to 60%, more preferably in a range of 5% to 50%, and even more preferably in a range of 20% to 50%.

It is also preferred that r1−r2 is 0.3 mm to 1 mm.

As shown in FIG. 6, the first end opening 52a of the cylindrical housing 52 is closed by the disk-shaped closing member 60 attached to the first end opening 52a.

A circumferential edge of the first surface 61 is abutted against the annular stepped surface 57, and the circumferential surface 63 and the second annular circumferential edge 64b, which has the inclined surface 67, are abutted against the distal end circumferential wall 53a.

The remaining portion of the distal end circumferential wall 53a extends in the same direction as the long axis X.

A known rolling-swaging method is applied as a method for closing the first end opening 52a with the flat plate-shaped closing member 60 as shown in FIG. 6.

The second end opening 52b of the cylindrical housing 52 can be closed with an igniter in the same manner as shown in FIGS. 4 and 5.

As a result of closing the first end opening 52a with the flat plate-shaped closing member 60 as shown in FIG. 6, a sealing property is enhanced and the sealing property is maintained even at the time of actuation.

The closing structure with the flat plate-shaped closing member 60 for the cylindrical housing 52 shown in FIG. 6 is applicable in, for example, the closing structure with the second closing member 14 for the opening 13b of the cylindrical housing 12 in the gas generator 10 shown in FIG. 1 of JP-A No. 2011-225069, the closing structure with the second closing member 14 for the opening 13b of the cylindrical housing 12 in the gas generator 10 shown in FIG. 1 of JP-A No. 2011-218942, and the closing structure with the second closure 16 for the cylindrical housing 11 in the gas generator 10 shown in FIG. 1 of JP-A No. 2007-30656.

Test Example

A rotation prevention effect of the igniter attached to the cylindrical housing was tested.

A cylindrical housing (a product according to the present invention) with use of the closing structure with the igniter shown in FIG. 4 (the inclined surface 17 being formed in four locations at equal intervals in the circumferential direction), and a cylindrical housing (a comparative product) with use of the closing structure with the igniter shown in FIG. 4 in which an igniter collar has no inclined surface 17, were used.

In the inclined surface 17, an angle (θ) is 450, a length is 6 mm in the circumferential direction, (W2/W1)×100=30%, and W2=0.5 mm.

The test was carried out in accordance with the rotation test described in paragraph 0047 in JP-A No. 2009-51236.

Specifically, a measuring jig (a torque wrench) was inserted into the connector insertion space inside the first circumferential wall 15a of the product according to the present invention and the comparative product, a torque was applied, and the torque was measured at the time the igniter (igniter collar) rotated. At this time, the convex portion of the torque wrench was fitted into the concave portions (in two locations) of the metal collar exposed in the connector insertion space and rotated.

As a result, the torque at the start of rotation of the product according to the present invention (FIG. 4) was 8 Nm, and the torque at the start of rotation of the comparative product was 4 Nm.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A closing structure of a gas generator closing, comprising:
   a cylindrical housing having two openings at both ends;
   an igniter that closes one of the two openings;
   the cylindrical housing being provided with a stepped surface formed radially on an inner side of a circumferential wall on a side of the one of two openings, and a distal end circumferential wall extending from the stepped surface to the one of two openings;
   the igniter having an igniter main body including an ignition portion and an electroconductive pin extending axially in a direction opposite to the ignition portion, and an igniter collar surrounding part of the igniter main body;
   the igniter collar having an annular plate portion protruding radially outward and having a maximum outer diameter, and a circumferential wall excluding the annular plate portion;
   the annular plate portion including,
      a first annular surface facing the ignition portion, a second annular surface facing the electroconductive pin, and an annular circumferential surface extending between the first annular surface and the second annular surface, a first annular circumferential edge at a boundary between the first annular surface and the annular circumferential surface, and a second annular circumferential edge at a boundary between the second annular surface and the annular circumferential surface, and the second annular circumferential edge; being provided with an inclined surface in not less than three locations, and the first annular surface of the igniter collar being abutted against the stepped surface of the cylindrical housing, and the annular circumferential surface and the second annular circumferential edge being abutted against the distal end circumferential wall to close the one of two openings of the cylindrical housing provided with the stepped surface and the distal end circumferential wall.

2. The closing structure according to claim 1, wherein the first annular surface of the igniter collar is abutted against the stepped surface of the cylindrical housing, the annular circumferential surface and the second annular circumferential edge provided with the inclined surface are abutted against part of the distal end circumferential wall, so that an opening of the cylindrical housing, provided with the stepped surface and the distal end circumferential wall, is closed, and a remaining portion of the distal end circumferential wall is extended in a direction along a circumferential wall of the igniter collar, and a gap is formed between an inner circumferential surface of the remaining portion and an outer circumferential surface of the circumferential wall of the igniter collar.

3. The closing structure according to claim 1, wherein, in the igniter collar, the annular plate portion is made of a metal, and the circumferential wall is made of a resin.

4. The closing structure according to claim 1, wherein the inclined surface of the second annular circumferential edge of the igniter collar is inclined such that an angle between the inclined surface and a surface extending along the second annular surface is 30° to 60°.

5. A gas generator, comprising:
the closing structure according to claim 1;
a diffuser portion being provided with a gas discharge port and arranged at a first end opening which is another one of the two openings of the cylindrical housing;
the closing structure being arranged at a second end opening which is the one of the two openings of the cylindrical housing; and
a space defined between the diffuser portion and the igniter.

6. A gas generator, comprising:
the closing structure according to claim 1;
a first end opening, which is the one of the two openings of the cylindrical housing, being closed;
the closing structure being arranged at a second end opening, which is another one of the two openings of the cylindrical housing.

7. A closure structure according to claim 1, wherein the inclined surface and an inner circumferential surface of the distal end circumferential wall are abutted against each other.

8. A closing structure, comprising:
a cylindrical housing having two openings at both ends;
a flat plate-shaped closing member closing the one of two openings of the cylindrical housing;
the cylindrical housing being provided with a stepped surface formed radially on an inner side of a circumferential wall on a side of one of the two openings, and a distal end circumferential wall extending from the stepped surface to the one of two openings;
the flat plate-shaped closing member having
a first surface, a second surface on the opposite side in a thickness direction, and a circumferential surface extending between the first surface and the second surface,
a first annular circumferential edge at a boundary between the first surface and the circumferential surface, and a second annular circumferential edge at a boundary between the second surface and the circumferential surface, and
the second annular circumferential edge, being provided with an inclined surface in not less than three locations, and
the first surface of the flat plate-shaped closing member being abutted against the stepped surface of the cylindrical housing, and the circumferential surface and the second annular circumferential edge of the flat plate-shaped closing member being abutted against the distal end circumferential wall to close the one of two openings of the cylindrical housing is provided with the stepped surface and the distal end circumferential wall.

9. The closing structure according to claim 8, wherein the inclined surface of the second annular circumferential edge of the closing member is inclined such that an angle between the inclined surface and the surface extending along the second surface is 30° to 60°.

10. A gas generator, comprising:
the flat plate-shaped closing member according to claim 9;
a cylindrical housing provided with a gas discharge port in a circumferential wall;
the closing structure with a flat plate-shaped closing member being arranged at a first end opening of the cylindrical housing;
an igniter being attached to a second end opening of the cylindrical housing.

11. A gas generator, comprising:
the flat plate-shaped closing member according to claim 8;
a cylindrical housing provided with a gas discharge port in a circumferential wall;
the closing structure with a flat plate-shaped closing member being arranged at a first end opening of the cylindrical housing;
an igniter being attached to a second end opening of the cylindrical housing.

12. A closure structure according to claim 8, wherein the inclined surface and an inner circumferential surface of the distal end circumferential wall are abutted against each other.

* * * * *